(12) United States Patent
Wiechowski et al.

(10) Patent No.: US 7,896,423 B2
(45) Date of Patent: Mar. 1, 2011

(54) RETRACTABLE HARDTOP WITH TWO-PIECE REAR SECTION AND REMOVABLE FRONT ROOF PANELS

(75) Inventors: Robert D. Wiechowski, Warren, MI (US); Robert E. Fallis, III, Rochester, MI (US); Michael T. Willard, Harrison Township, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 128 days.

(21) Appl. No.: 12/254,371

(22) Filed: Oct. 20, 2008

(65) Prior Publication Data

US 2009/0102229 A1 Apr. 23, 2009

Related U.S. Application Data

(60) Provisional application No. 60/981,286, filed on Oct. 19, 2007.

(51) Int. Cl.
*B60J 7/00* (2006.01)
(52) U.S. Cl. .................................... 296/107.17; 296/218
(58) Field of Classification Search ............. 296/107.17, 296/146.16, 218
See application file for complete search history.

(56) References Cited

U.S. PATENT DOCUMENTS

| | | | |
|---|---|---|---|
| 2,623,779 A | 12/1952 | Catell | |
| 2,632,670 A | 3/1953 | Crenshaw | |
| 2,754,149 A | 7/1956 | McGrath et al. | |
| 3,021,174 A | 2/1962 | Rund | |
| 3,059,962 A | 10/1962 | Harms et al. | |
| 3,690,722 A | 9/1972 | Bakewicz et al. | |
| 4,729,596 A * | 3/1988 | Fujihara et al. | 296/218 |
| 4,821,394 A * | 4/1989 | Martinez-Vera | 29/401.1 |
| 4,852,935 A * | 8/1989 | Varner | 296/146.14 |
| 5,080,428 A * | 1/1992 | Rouland | 296/218 |
| 5,265,930 A * | 11/1993 | Klein et al. | 296/107.17 |
| 5,429,409 A | 7/1995 | Corder et al. | |
| 5,501,052 A * | 3/1996 | Saji | 52/716.5 |
| 5,513,891 A * | 5/1996 | Horiuchi | 296/37.1 |
| 5,558,388 A | 9/1996 | Furst et al. | |
| 5,743,587 A | 4/1998 | Alexander et al. | |
| 5,769,483 A | 6/1998 | Danzl et al. | |
| 6,039,383 A * | 3/2000 | Jambor et al. | 296/108 |
| 6,053,560 A | 4/2000 | Rothe | |
| 6,131,988 A * | 10/2000 | Queveau et al. | 296/107.17 |
| 6,312,042 B1 | 11/2001 | Halbweiss et al. | |
| 6,729,672 B2 | 5/2004 | Neubrand | |
| 6,957,843 B2 | 10/2005 | Guillez | |
| 7,134,708 B2 | 11/2006 | Russke | |
| 7,240,952 B2 | 7/2007 | Gandemer et al. | |
| 2002/0003355 A1 | 1/2002 | Mac Farland | |
| 2002/0036413 A1 | 3/2002 | Neubrand et al. | |

* cited by examiner

*Primary Examiner* — Joseph D Pape
(74) *Attorney, Agent, or Firm* — Brooks Kushman P.C.

(57) ABSTRACT

A top for a vehicle that has a stationary support disposed between removable panels forward of the support and a multiple section retractable hardtop rearward of the support. The detachable roof panels are provided in front of the stationary support and extend across the vehicle laterally and to the windshield header when installed. A two piece retractable hardtop is provided rearward of the stationary support that has a back light that is disposed to cover a back light opening in an extended position and is detached from the back light opening in a retracted position.

9 Claims, 10 Drawing Sheets

RETRACTABLE HARDTOP WITH TWO-PIECE REAR SECTION AND REMOVABLE FRONT ROOF PANELS

CROSS-REFERENCE TO RELATED APPLICATIONS

This application claims the benefit of U.S. provisional application Ser. No. 60/981,286 filed Oct. 19, 2007.

BACKGROUND OF THE INVENTION

1. Field of the Invention

The present invention relates to a top for a vehicle that has a stationary intermediate support between removable panels forward of the support and a multiple section retractable hardtop rearward of the support.

2. Background Art

A wide variety of vehicle tops are available, ranging from conventional hardtops to retractable convertible tops. Recently, retractable hardtops have become more popular for high-end vehicles. Retractable hardtops require substantial storage space. The amount of storage space required for retractable hardtops increases as the size of the retractable hardtop panels increase and as the number of retractable sections increases.

Most retractable hardtops are designed to be used in a fully extended position or a fully retracted position. There is a need for a retractable hardtop that provides additional operational positions that adds versatility to the top.

The present invention is directed to overcoming the above problems by providing a simple, cost-effective and versatile retractable hardtop.

SUMMARY OF THE INVENTION

According to one aspect of this development, a retractable hardtop for a vehicle is provided that has a stationary support rail that is attached to and extends in a cross-car direction on the vehicle. A pair of detachable front roof panels are provided in front of the stationary support rail and extend across the vehicle laterally and to the windshield header when installed. A two piece retractable hardtop is provided rearward of the stationary support rail and has a back light that is disposed to cover a back light opening in an extended position and is detached from the back light opening in a retracted position.

According to another aspect of this development, a rear retractable hardtop is provided for a vehicle that includes a front roof section and a rear roof section. The rear roof section defines a back light opening that is selectively closed by a back light that is detachably received in the back light opening. A linkage articulately connects the front roof section, rear roof section and back light together. The front roof section is articulately connected to the rear roof section to move from an extended position in front of and contiguous with the rear roof section to a retracted position in a storage compartment. The rear roof section is articulately connected to the vehicle and the front roof section to move from an extended position extending from the front roof section to the vehicle to a retracted position in which the rear roof section is in the storage compartment. The back light is articulately connected to the rear roof section to move from an extended position in which the back light is received in the back light opening to a retracted position in which the back light is separated from the back light opening in the storage compartment.

In one illustrative embodiment, in the retracted position, the front roof section is disposed behind the rear roof section, the rear roof section is inverted and the back light is disposed forward of the front roof section and overlies the back roof section. A window guide flange may be assembled to the rear roof section that defines an arcuate slot and at least one guide pin is assembled to the back light that guides the movement of the back light relative to the rear roof section. A main link may be secured to a main bearing flange and to the front roof section. A back section extension may be fixedly secured to the back section and pivotally connected to the front roof section. A lower link may be pivotally attached to the main bearing flange and the at least one guide pin to shift the at least one guide pin through the arcuate slot as the hardtop is moved between the extended position and the retracted position.

In another illustrative embodiment, in the retracted position, the front roof section is disposed over the back light and rear roof section and the back light is disposed between the front roof section and the rear roof section in the retracted position. A window separating link and a back section link separate the back light from the back light opening of the rear roof section and guides the movement of the back light relative to the rear roof section. A front link may be pivotally connected to the front roof section, an intermediate link and a main link. A forward flange may be secured to the rear roof section and a rearward flange may be secured to the front roof section such that the forward flange lifts the front roof section above the rear roof section as the hardtop is moved from the extended position to the retracted position.

According to yet another aspect of this development, a hardtop is provided for a vehicle that defines a roof opening. The hardtop comprises a right front roof panel having a right side rail and a right panel center rail and a left front roof panel having a left side rail and a left panel center rail. A support is affixed to one of the center rails and detachably assembled to the other of the center rails. A latching mechanism is incorporated in each of the right and left side rails. The right and left roof panels are detachably assembled to the vehicle to cover the roof opening in an closed position with the support assembled to the other center rail and with the latching mechanisms being secured to the vehicle. The right and left roof panels are removed from the opening to leave the opening unobstructed. The latching mechanisms are not secured to the vehicle and the support is disassembled from the other center rail when the panels are removed.

The hardtop may further comprise a seal assembled to the support on the one center rail and engaging the other of the center rails to establish a seal with the other center rail. A fascia panel may be assembled to an inner lower side of the other of the center rails to trim out an area between the right and left roof panels when the panels are in the closed position. The roof opening may be defined, in part, by a stationary support extending above a passenger compartment of the vehicle in a cross-car direction.

These and other aspects of this development will be better understood in view of the attached drawings and the following detailed description of the illustrated embodiments.

DETAILED DESCRIPTION OF THE PREFERRED EMBODIMENT(S)

Figure 1:
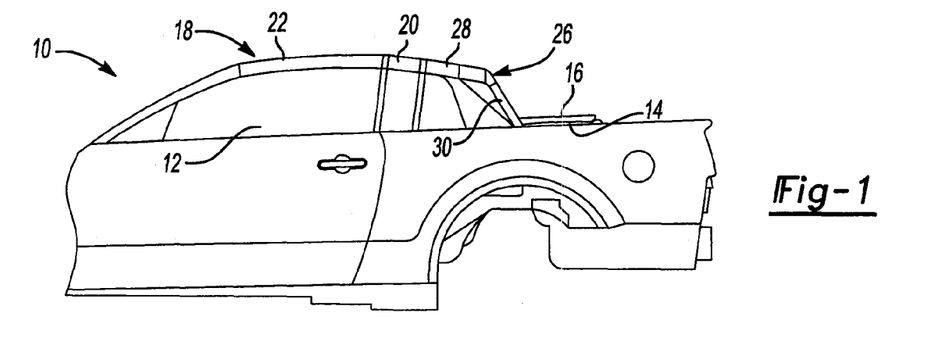
FIG. 1 is a side elevation view of one embodiment of the retractable hardtop in the fully extended position.

Referring to FIG. 1, a vehicle 10 is illustrated that includes a passenger compartment 12 and a storage compartment 14. The storage compartment 14 is covered by a tonneau 16. A roof, generally indicated by reference numeral 18, includes a stationary support 20 that extends laterally across the vehicle 10 and above the passenger compartment 12. As shown in FIG. 1, the roof 18 is in its position in which it fully covers the passenger compartment 12. A pair of front rigid roof panels 22 are provided in front of the stationary support 20. The front rigid roof panels 22 are manually removable. A rear retractable hardtop is generally identified by reference numeral 26. The rear retractable hardtop 26 includes a front section 28 and a back section 30.

Figure 2:
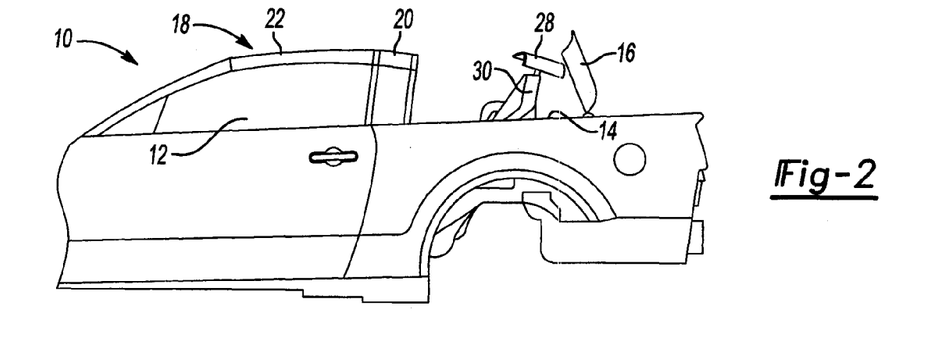
FIG. 2 is a side elevation view of the embodiment of the retractable hardtop shown in FIG. 1 with the rear retractable hardtop portion partially retracted.

Referring to FIG. 2, the vehicle shown with the front rigid roof panels 22 covering the forward part of the passenger compartment 12. The rear retractable hardtop 26 is shown with the front section 28 partially retracted to a position above the back section 30. The tonneau 16 is raised to permit the rear retractable hardtop 26 to be retracted into the storage compartment 14.

Figure 3:
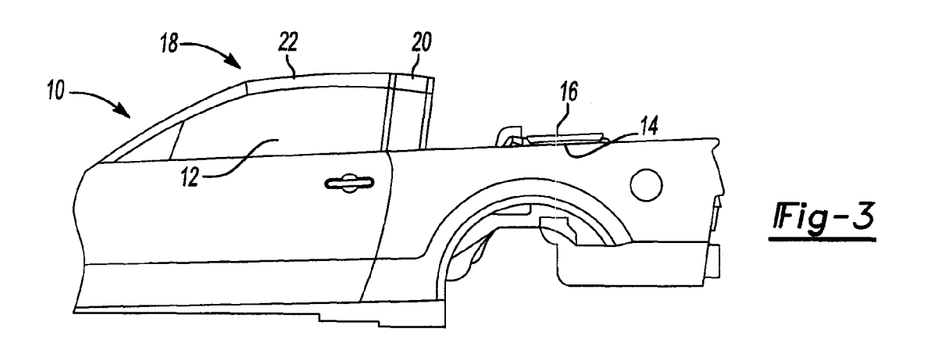
FIG. 3 is a side elevation view of the embodiment of the retractable hardtop shown in FIG. 1 with the hardtop stowed below a tonneau cover.

Referring to FIG. 3, the roof 18 is shown with the front rigid roof panels 22 in place above the passenger compartment 12. The rear retractable hardtop 26 is stowed in the storage compartment 14 below the tonneau 16. In this configuration, the rear retractable hardtop 26 is fully retracted so that the passenger compartment 12 above the rear seat passengers is open.

Figure 4:
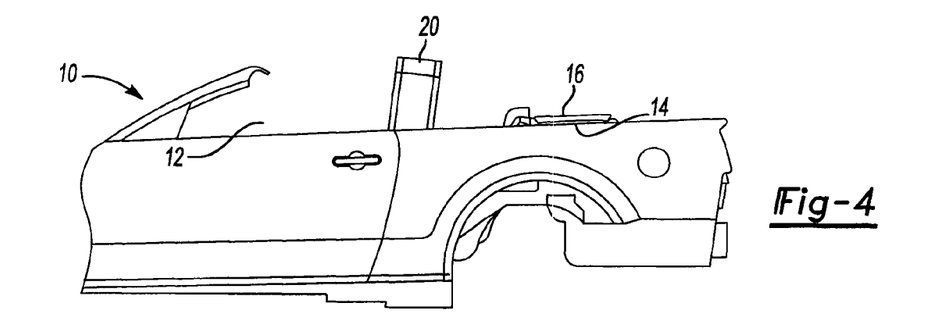
FIG. 4 is a side elevation view of the embodiment of the retractable hardtop shown in FIG. 1 shown with the rear retractable hardtop stowed and the front panels removed from between the stationary support and the windshield header.

Referring to FIG. 4, the vehicle 10 is shown with the front rigid roof panels 22 removed and the rear retractable hardtop (not shown) stored in the storage compartment 14 below the tonneau 16. The stationary support 20 remains in the same position regardless of the position of the front roof panels 22 and the rear retractable hardtop 26.

Figure 5:
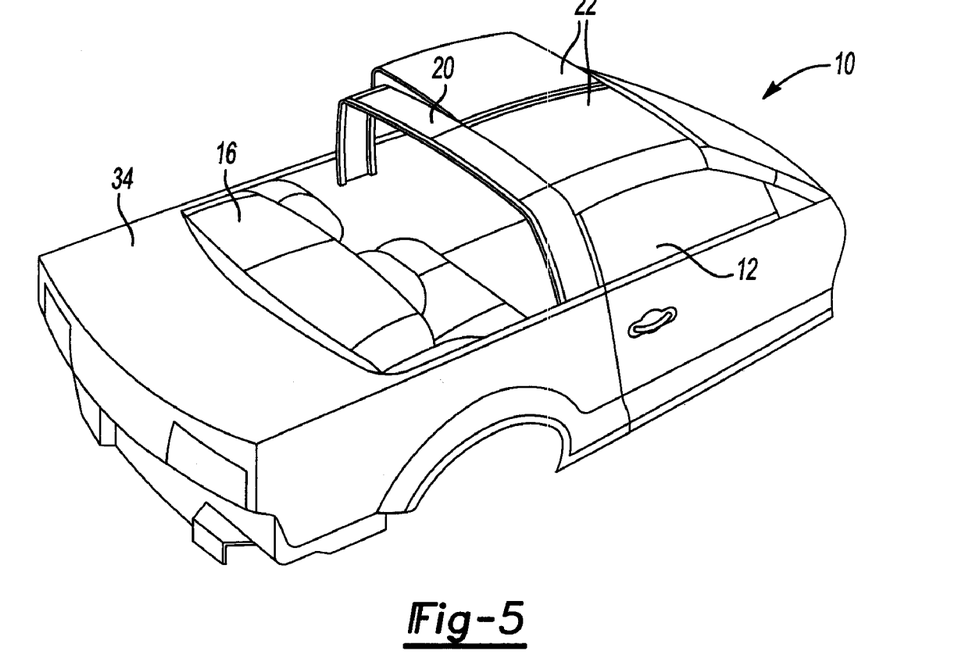
FIG. 5 is a rear/side perspective view of the embodiment of the retractable hardtop shown in FIG. 1 with the rear retractable hardtop retracted and one of the rigid front panels partially separated from the vehicle.

Referring to FIG. 5, the vehicle 10 is shown with the rear retractable hardtop (not shown) stowed below the tonneau 16. The front rigid roof panels 22 are shown with the rigid roof panel above the right side passenger in place and the rigid roof panel above the left front seat passenger being partially detached.

Figure 6:
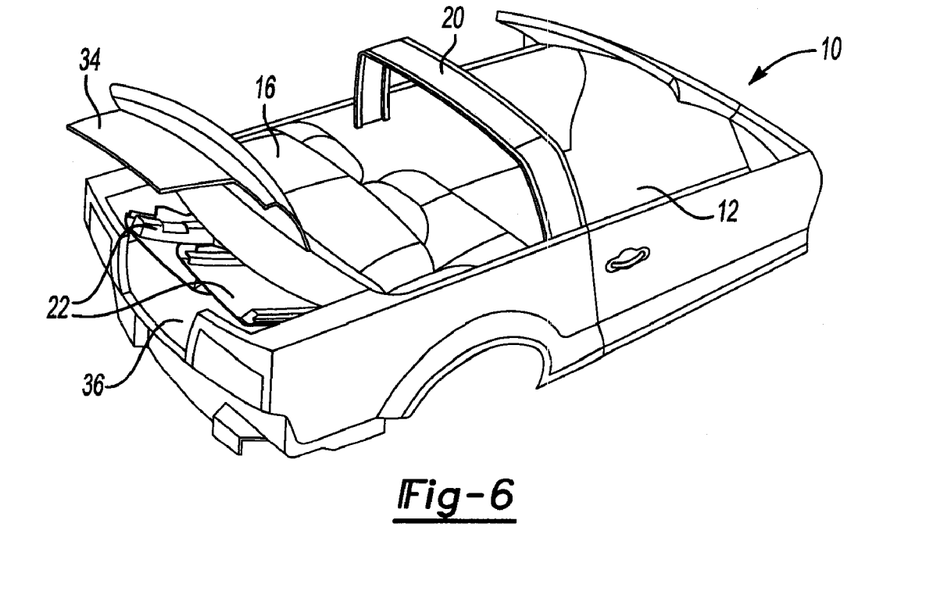
FIG. 6 is a rear/side elevation view of the embodiment of the retractable hardtop shown in FIG. 1 showing the rigid front roof panels removed and stowed in the trunk of the vehicle.

Referring to FIG. 6, the vehicle 10 is shown with the passenger compartment completely open with the front roof panels 22 and the rear retractable hardtop (not shown) are removed. The rear retractable hardtop is stowed below the tonneau 16 while the front roof panels 22 are shown with the decklid 34 in a raised position exposing the trunk 36 of the vehicle. The front roof panels 22 are stowed within the trunk 36.

Figure 7A:
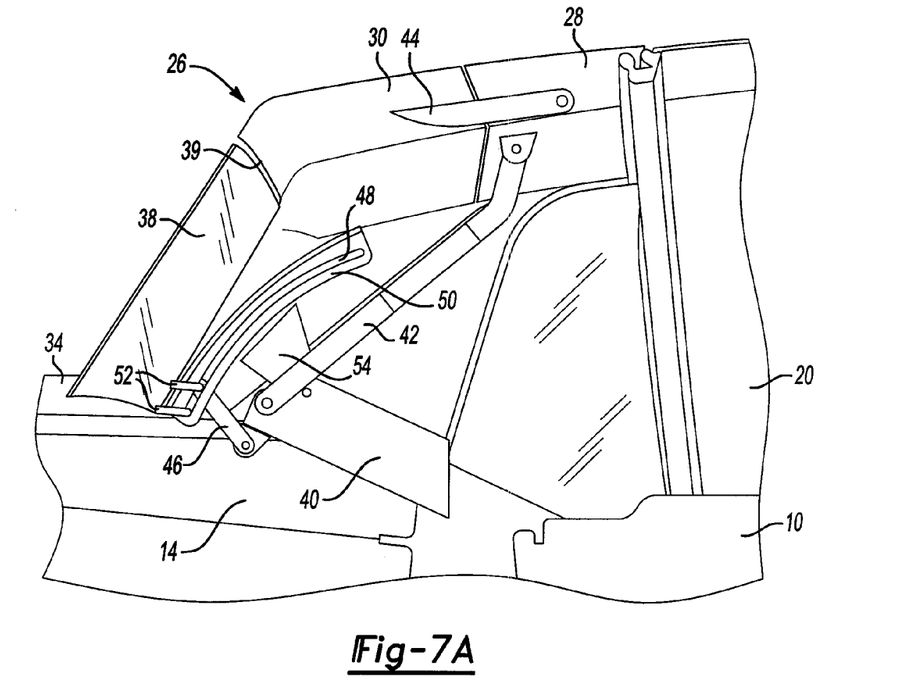
FIGS. 7A-7D are sequential fragmentary inside perspective views showing a linkage for the retractable hardtop at different points in the retraction cycle along with the stationary support.

Referring to FIGS. 7A-7D, the rear retractable hardtop 26 is shown in a sequence of views beginning with the rear retractable hardtop 26 in its closed, or extended position, in FIG. 7A. The roof is in the early retraction phase in FIG. 7B, late retraction stage in FIG. 7C, and in its fully retracted position in FIG. 7D. The rear retractable hardtop 26 includes the front section 28 and the back section 30 that is disposed above and forward of the decklid 34. A back light 38 is separated from the back section 30 during the retraction cycle to reduce the space required for storage of the top 26 in the storage compartment 14.

Referring specifically to FIG. 7A, the front roof section 28 is disposed in front of the back section 30. The back section 30 extends from the front section 28 to the decklid 34. The back light 38 is disposed within a window opening 39 defined in the back section 30. The roof is supported on a main bearing flange 40. The main bearing flange 40 is connected by a main link 42 to the front section 28. A back section extension 44 is fixedly connected to the back section 30 and pivotally connected to the front section 28. A lower link 46 is pivotally connected to the main bearing flange 40 and extends to an arcuate slot 48 formed in a window guide flange 50. A pair of guide pins 52 connect the window guide flange 50 to the lower link 46 and the back section 30. A lower rear roof flange 54 is fixedly connected to the back section 30 and is pivotally connected to the main bearing flange 40.

Figure 7B:
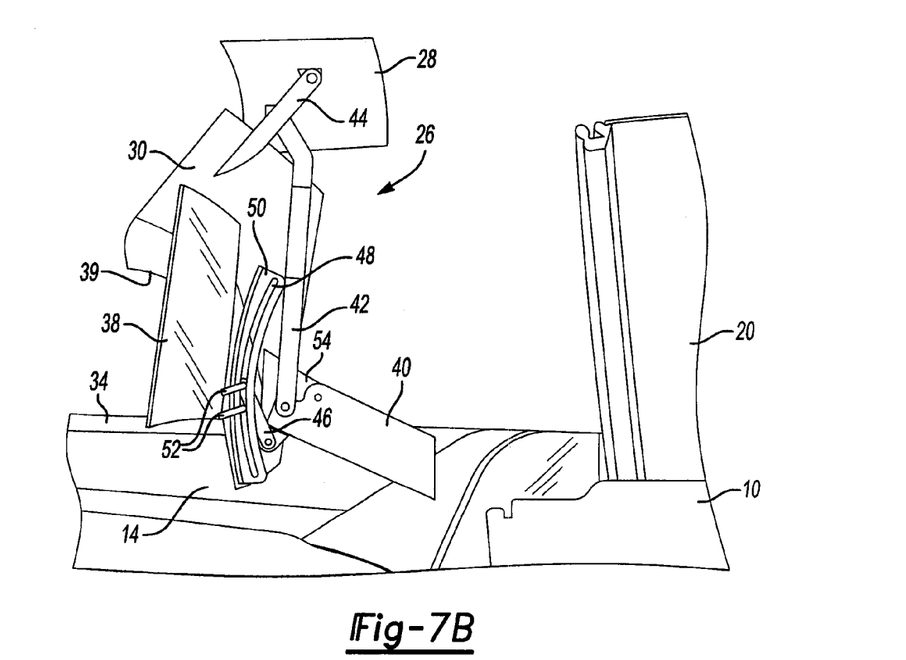

Referring to FIG. 7B, the rear retractable hardtop 26 is shown partially retracted with the main link 42 being pivoted to a nearly vertical orientation moving the front section 28 rearwardly as it rotates in a counter-clockwise rotation as shown in FIG. 7B. The front section 28 moves above the back section 30. The back light 38 is separated from the back section 30 and guided by the window guide flange 50 and guide pins 52 through the arcuate slot 48. The back section 30 pivots on the lower rear roof flange 54.

Figure 7C:
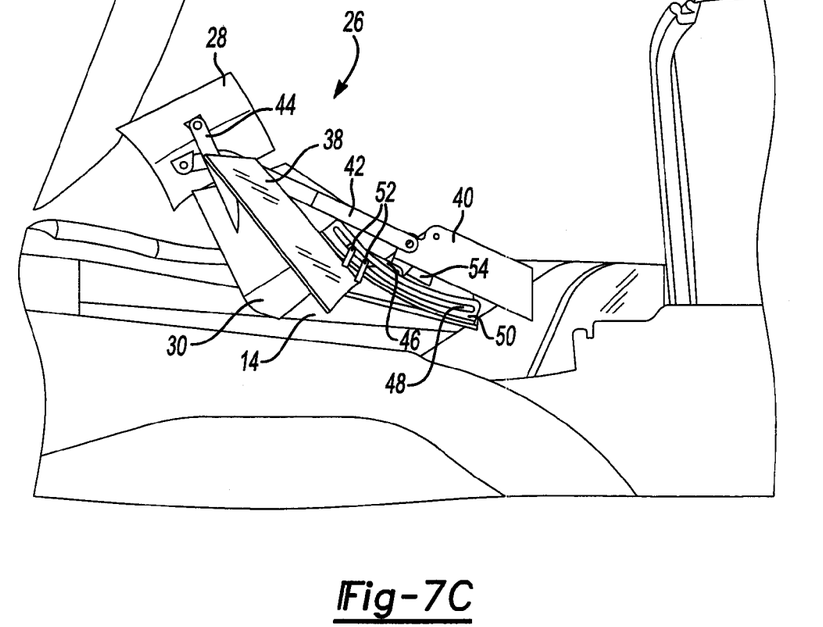

Referring to FIG. 7C, the top 26 is shown in a further retracted position in which the main link 42 is pivoted on the main bearing flange in a counter-clockwise direction compared to FIG. 7B to a nearly horizontal position. In this position, the front section 28 is above and rearward of the back section 30. The back light 38 has been guided through the arcuate slot 48 of the window guide flange 50 on the pins 52 to a position in which the back light 38 is inclined rearwardly and upwardly.

Figure 7D:
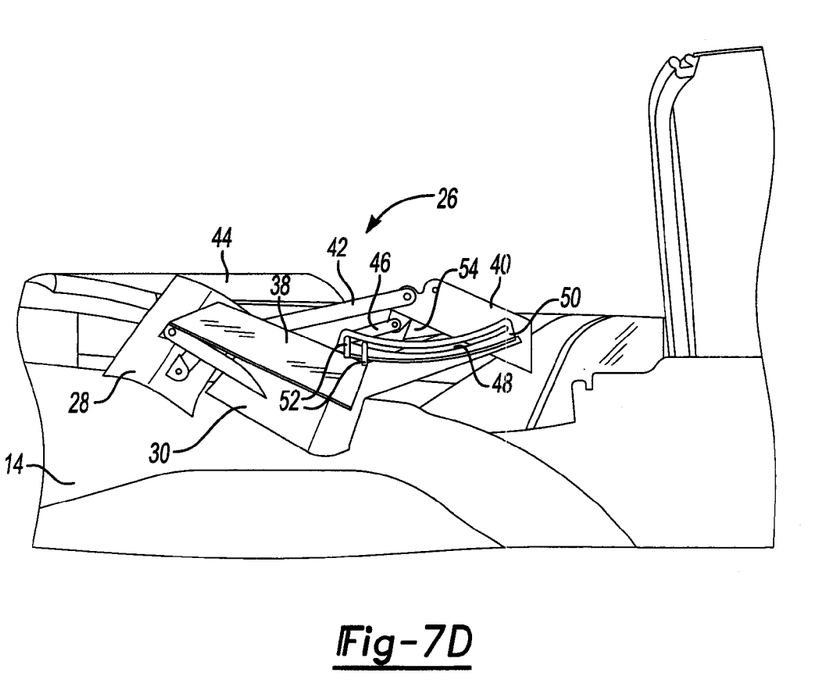

Referring to FIG. 7D, the top 26 is shown in its fully retracted position in which the front section 28 is disposed rearward of the back section 30 and the back light 38 is disposed above the back section 30. In this position, the guide pins 52 are at the opposite end of the arcuate slot 40 in the window guide flange 50 as compared to FIG. 7A. The main link 42 extends rearwardly and slightly downwardly from the main bearing flange 40. The rear retractable hardtop 26 is now stored in a compact manner in the storage compartment 14.

Figure 8:
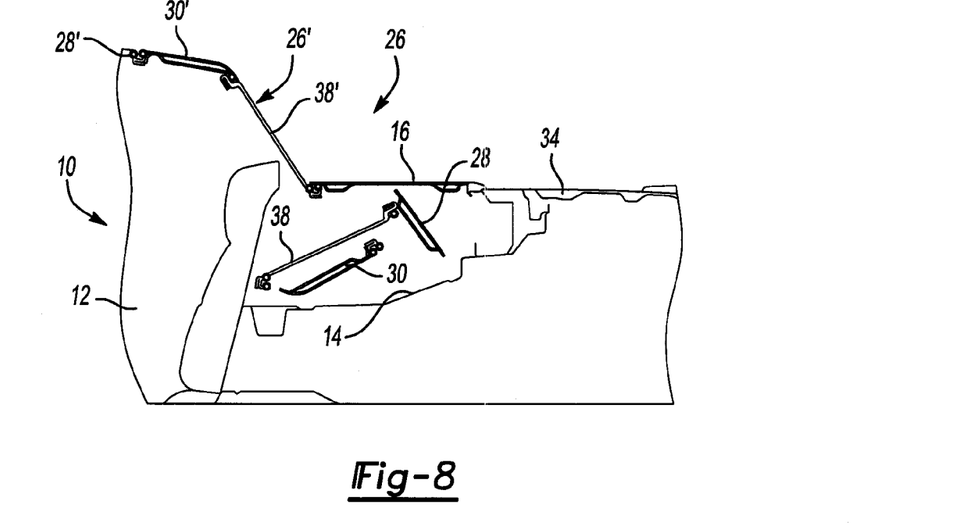
FIG. 8 is a schematic cross-sectional view showing the rear retractable hardtop of FIGS. 7A-7D in both its extended position and in its retracted position.

Referring to FIG. 8, the rear retractable hardtop 26 is shown in its stored position with the front section 28 stored behind and above the back section 30. The back light 38 is disposed above the back section 30. The rear retractable hardtop 26 is stored below the tonneau 16 in the storage compartment 14. The tonneau 16 is disposed in front of the decklid 34. The top 26' is also shown in the extended position in FIG. 8 (with a prime (') added to the reference numerals) wherein the front section 28' is disposed between the stationary support 20 and the back light 38'.

Figure 9:
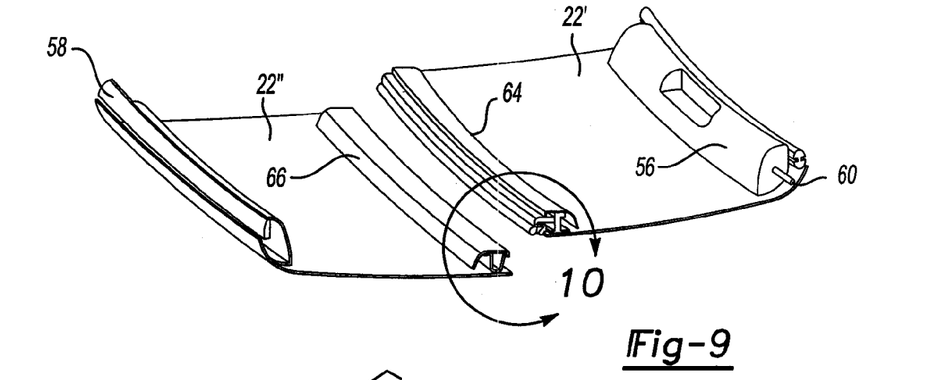
FIG. 9 is a perspective view showing the removable front roof panels detached from a vehicle and from each other in an inverted position.

Referring to FIG. 9, the front rigid roof panels 22 are shown in greater detail. Right front roof panel 22' is shown separated from left front roof panel 22" in an inverted orientation to better illustrate the interlocking parts thereof. The right panel 22' has a right side rail 56. The left front roof panel 22" has a left side rail 58. A front locking rod 60 is shown protruding from the right side rail 56 that is used to lock the roof panel 22' to the windshield header (not shown in FIG. 9). A right panel center rail 64 and a left panel center rail 66 are shown separated from each other and are more specifically described with reference to FIG. 10.

Figure 10:
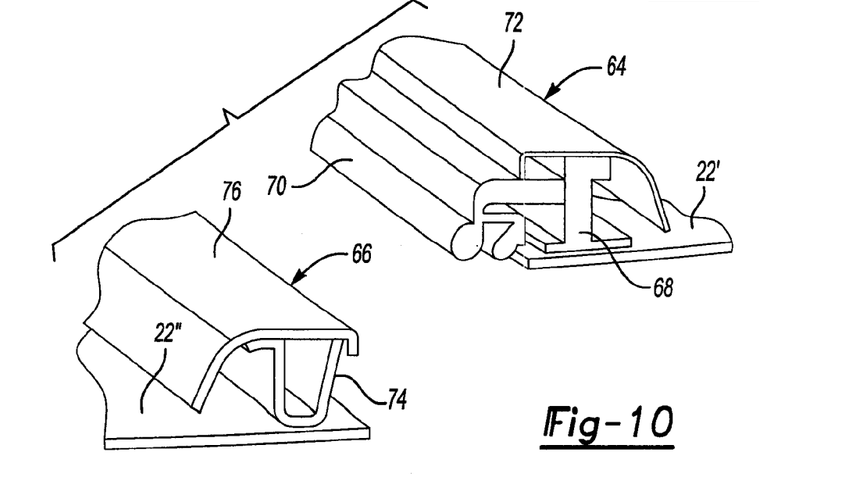
FIG. 10 is a fragmentary view taken within the circle 10 in FIG. 9 showing the center channel connection area in greater detail.

Referring to FIG. 10, the right panel center rail 64 includes a support 68 to which a seal 70 is secured to seal the area between the right and left panel center rails 64, 66. A fascia panel 72 covers the inner lower side of the right panel center rail 64 to trim out the interior of the roof panel 22'. Left panel center rail 66 is shown separated from the right side panel center rail 64. The left panel center rail 66 includes a channel 74 to which a fascia panel 76 is secured to trim the interior portion of the roof panel 22".

Figure 11:
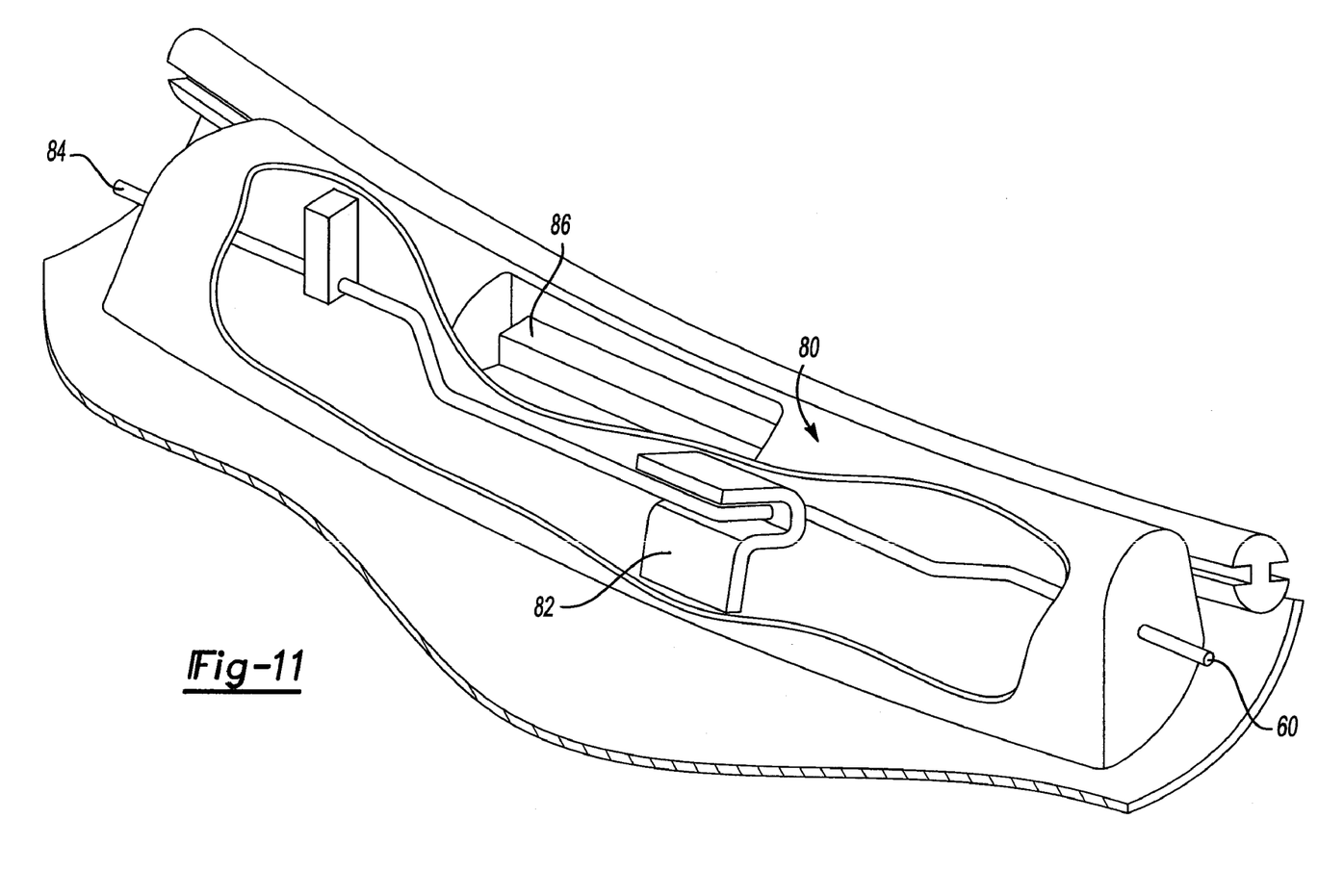
FIG. 11 is a fragmentary diagrammatic perspective view showing the release handle mechanism and the side rail of the removable front panels.

Referring to FIG. 11, a latching mechanism, generally indicated by reference numeral 80, uses a pivotable lever 82, or other type of operator, to extend and retract the front locking rod 60 and a rear locking rod 84. A handle 86 is operatively connected to the lever 82 to extend and retract the front locking rod 60 and the rear locking rod 84. Handle 86 is grasped by a user to extend and retract the front and rear locking rods 60 and 84.

Figure 12:
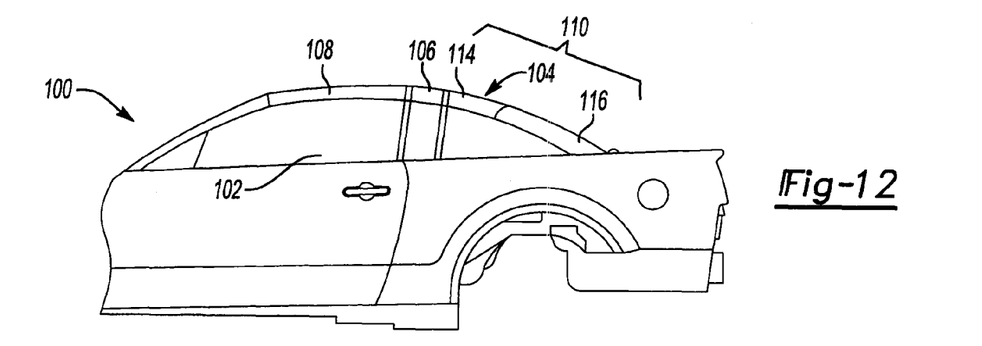
FIG. 12 is a side elevation view of another embodiment of the retractable hardtop that has a fastback appearance in its fully extended position.

Referring to FIG. 12, a vehicle 100 having a passenger compartment 102 is shown with the roof generally indicated by reference numeral 104 covering the passenger compartment 102. A stationary support 106 extends above the passenger compartment 102. Front rigid roof panels 108 are attached to the vehicle 100 in front of the stationary support 106. Panels 108 are identical to the rigid roof panels 22 described above and for brevity will not be described again with regard to this embodiment. A rear retractable hardtop 110 extends rearwardly from the stationary support 106 to the vehicle 100. The rear retractable hardtop 110 includes a front section 114 and a back section 116 that completes the structure of the roof 104.

Figure 13:
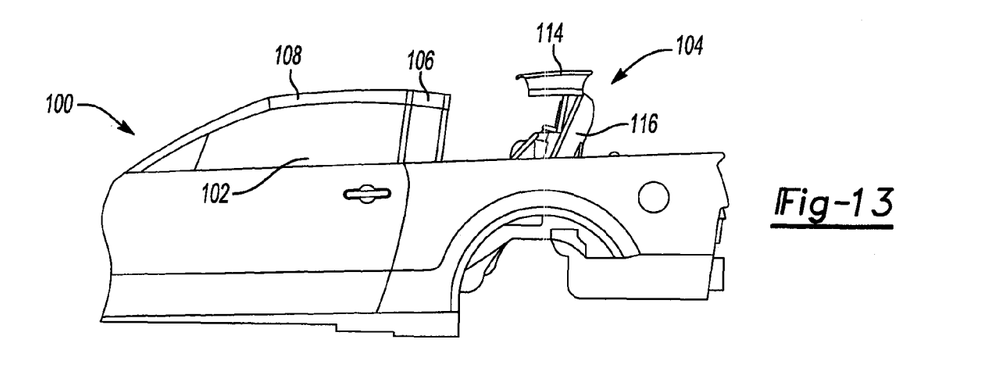
FIG. 13 is a side elevation view of the embodiment of the retractable hardtop shown in FIG. 12 with the rear retractable hardtop portion partially retracted.

Referring to FIG. 13, the vehicle 100 is shown with the rear retractable hardtop 110 partially retracted. The front section 114 is shifted rearwardly and the back section 116 is rotated in a clockwise direction to a position in which it is inclined rearwardly.

Figure 14:
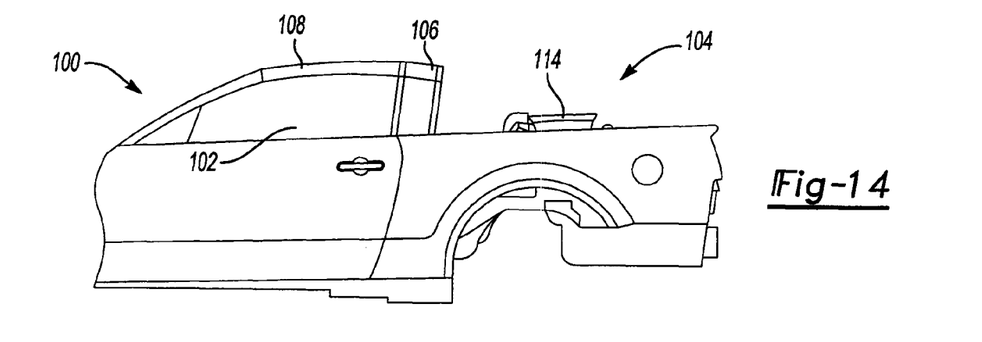
FIG. 14 is a side elevation view of the embodiment of the retractable hardtop shown in FIG. 12 with the hardtop stowed below a tonneau cover.

Referring to FIG. 14, the rear retractable hardtop 110 is shown fully retracted into the vehicle 100. The front section 114 of the rear retractable hardtop 110 is in a covering position above the belt line of the vehicle 110 and partially covering the storage compartment (not shown) in which the rear retractable hardtop 110 is stored.

Figure 15:
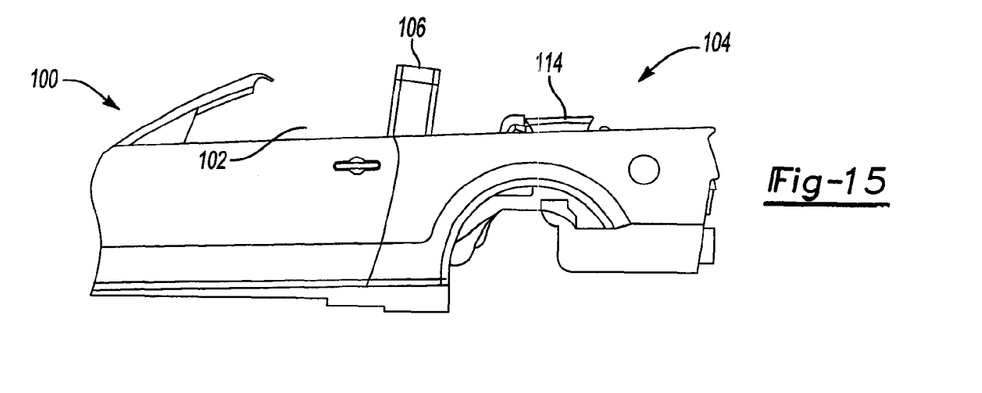
FIG. 15 is a side elevation view of the embodiment of the retractable hardtop shown in FIG. 12 shown with the rear retractable hardtop stowed and the front panels removed from between the stationary support and the windshield header.

Referring to FIG. 15, the vehicle 100 is shown with the front rigid roof panels 108 removed and the rear retractable hardtop 110 fully retracted into the storage compartment with the front section 114 disposed over the storage compartment in a covering orientation. The vehicle 100 can be operated in the position shown in FIGS. 12, 13 and 14 to provide a vehicle owner with increased flexibility for driving the vehicle.

Figure 16A:
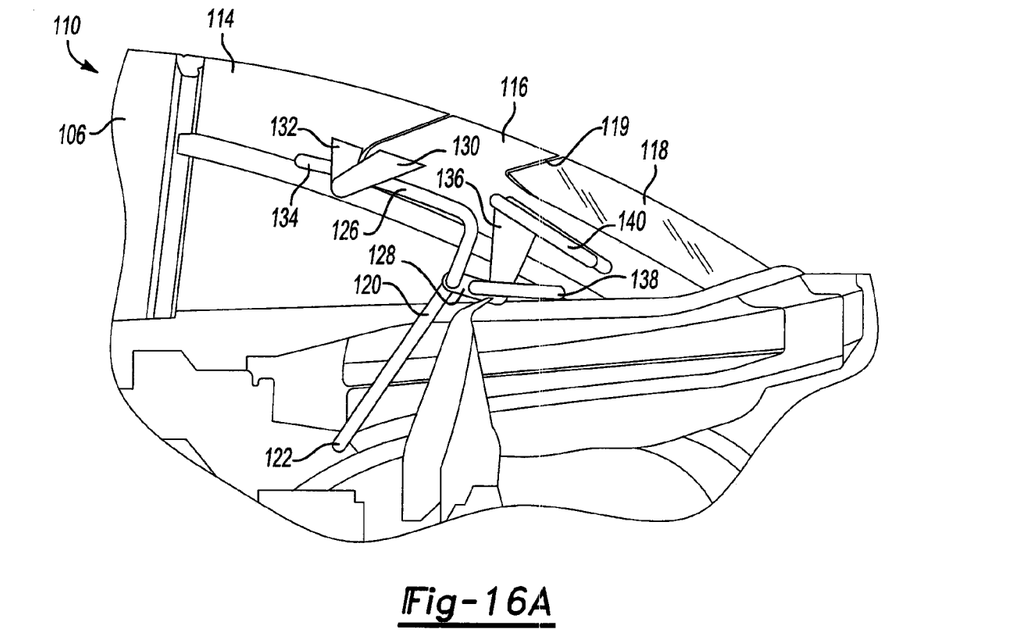
FIGS. 16A-16D are sequential fragmentary inside perspective views of the retractable hardtop linkage at different points in the retraction cycle along with the stationary support.

Referring to FIG. 16A, the rear retractable hardtop 110 is shown in its extended, or passenger compartment covering, position from the inside. The front section 114 is disposed between the stationary support 106 and the back section 116. A back light 118 is shown disposed within an opening 119 in the back section 116. The main link 120 is connected to the vehicle 100 at a main body pivot 122. A front link 126 is pivotally connected to the main link 120 and an intermediate link 128. A forward flange 130 on the back section 116 is pivotally connected to a rearward flange 132 on the front section 114. The front link 126 is secured to a front section pivot 134 in front of the forward flange 130. A rear section bracket 136 extends downwardly from the back section 116 and is pivotally connected to the intermediate link 128. A back section link 138 connects to the intermediate link 128 on its forward end and to the back section 116 on its back end. A window separating link 140 is operatively connected between the back section 116 and back light 118 to separate the back light 118 from the back section 116, as will be more particularly described with reference to FIGS. 16B-16D below.

Figure 16B:
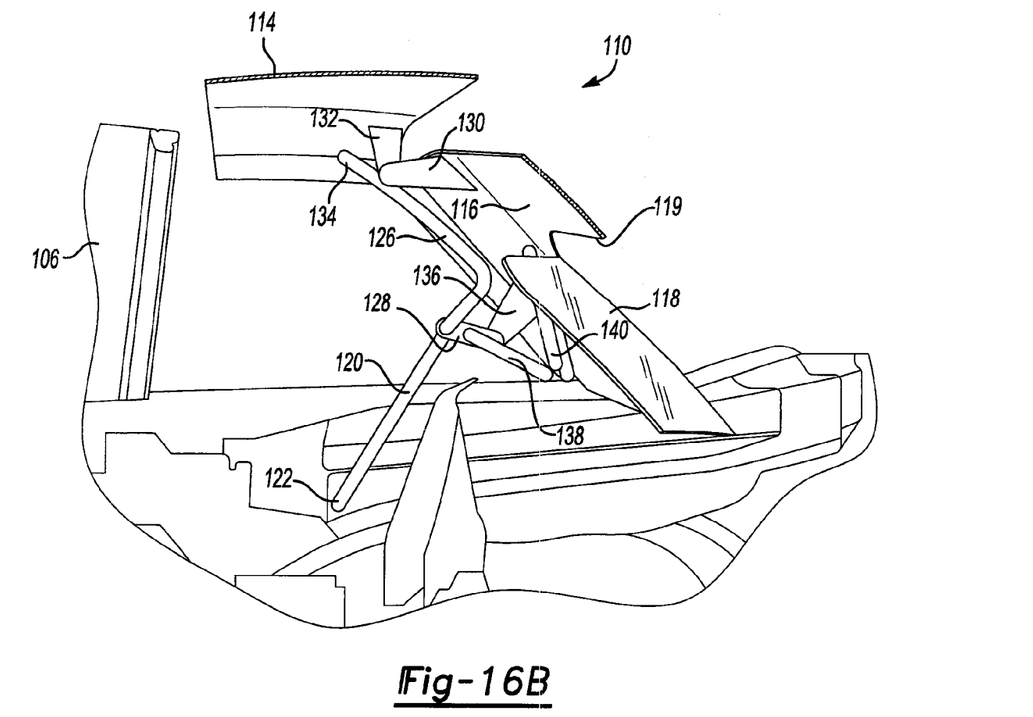

Referring to FIG. 16B, the rear retractable hardtop 110 is shown slightly retracted so that it has disengaged the stationary support 106. The front link 126 is rotated in the counter-clockwise direction to lift the front section 114 upwardly and rearwardly separating the front section 114 from the back section 116. The front section 114 and back section 116 are pivotally connected by the forward flange 130 and the rearward flange 132 which causes the front section 114 and back section 116 to fold in a clam-shell fashion. The intermediate link 128 controls the movement of the back section 116 and also cooperates with the window separating link 140 and back section link 138 to separate the back light 118 from the back section 116.

Figure 16C:
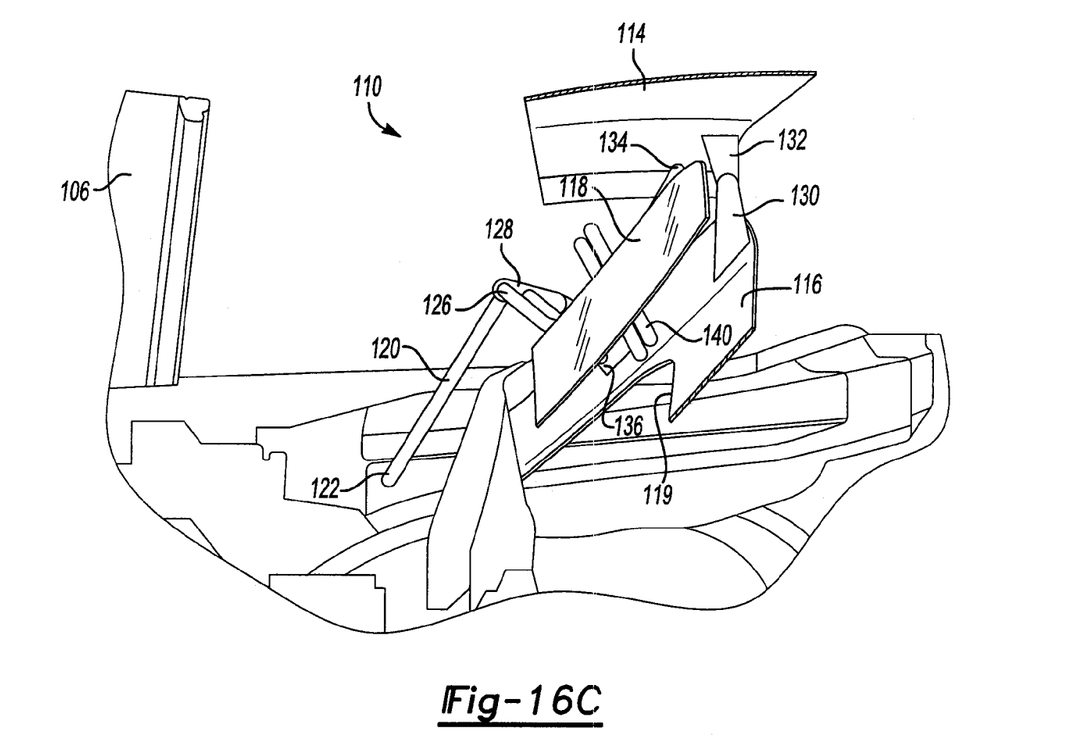

Referring to FIG. 16C, the rear retractable hardtop 110 is shown further retracted toward the storage compartment. In this position, the front section 114 is shifted rearwardly until it is over the back section 116 with the forward flange 130 and rearward flange 132 allowing the sections to fold over one another in a clam-shell configuration. The back light 118 is separated from the back section 116 on the window separating link 140. The front link 126 controls the movement of the front section 114 as it is folded rearwardly.

Figure 16D:
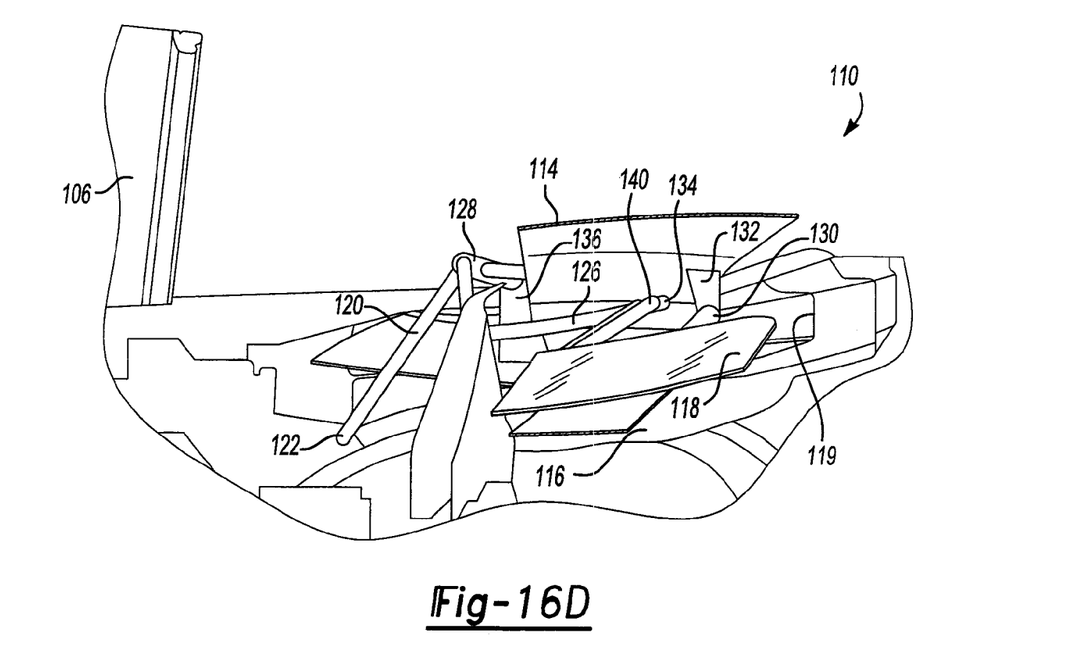

Referring to FIG. 16D, the rear retractable hardtop 110 is shown in its fully stowed position with the front roof section 114 disposed over the back light 118 and the back section 116. The back light 118 is positioned intermediate the front roof section 114 and back section 116 and is supported by the window separating link 140. The front link 126 extends downwardly from the intermediate link 128 and remains in pivotal connection with the front section 114 at the front section pivot 134.

Figure 17:
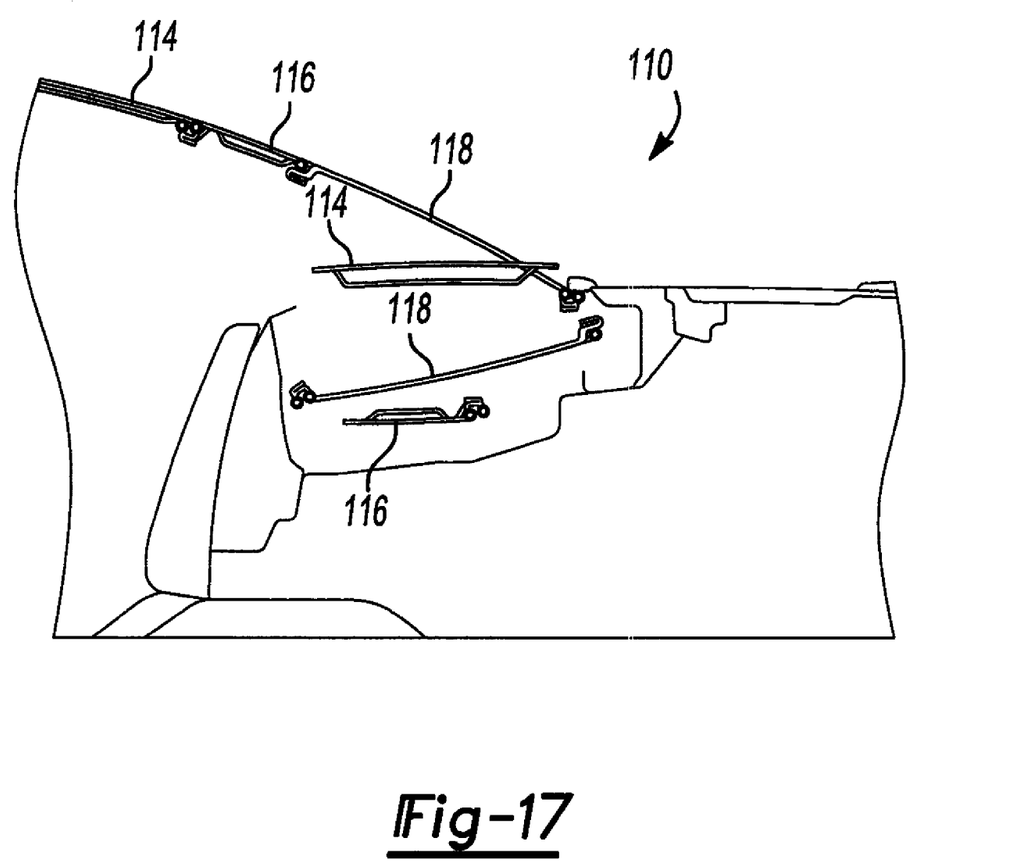
FIG. 17 is a schematic cross-sectional view showing the rear retractable hardtop of FIGS. 16A-16D in both its extended position and in its retracted position.

Referring to FIG. 17, a diagrammatic cross-sectional view is provided to show the major panels of the retractable hardtop 110 in their extended position (with a prime (') added to the reference numerals) and retracted position. The front roof section 114' in the extended position is forward of the back section 116' and is, in turn, forward of the back light 118. In the retracted position, the front section 114 is disposed above the back light 118, which in turn is disposed above the back section 116.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A rear retractable hardtop for a vehicle, comprising:
a front roof section;
a rear roof section defining a back light opening;
a back light detachably received in the back light opening;
a linkage articulately connecting the front roof section, the rear roof section and the back light together, wherein the front roof section is articulately connected to the rear roof section to move from an extended position in front of and contiguous with the rear roof section to a retracted position in a storage compartment, the rear roof section is articulately connected to the vehicle and the front roof section to move from an extended position extending from the front roof section to the vehicle, to a retracted position in which the rear roof section is in the storage compartment, and wherein the back light is articulately connected to the rear roof section to move from an extended position in which the back light is received in the back light opening to a retracted position in which the back light is separated from the back light opening in the storage compartment; and
a window guide flange assembled to the rear roof section that defines an arcuate slot and at least one guide pin which is assembled to the back light that guides the movement of the back light relative to the rear roof section.

2. The retractable hardtop of claim 1 wherein the front roof section is disposed behind the rear roof section, the rear roof section is inverted and the back light is disposed forward of the front roof section and overlies the back roof section in the retracted position.

3. The retractable hardtop of claim 1 further comprising a main link secured to a main bearing flange and to the front roof section, a back section extension fixedly secured to the back section and pivotally connected to the front roof section, a lower link pivotally attached to the main bearing flange and the at least one guide pin that shifts the at least one guide pin through the arcuate slot as the hardtop is moved between the extended position and the retracted position.

4. A retractable hardtop for a vehicle comprising:
a right front roof panel having a right side rail and a right panel center rail;
a left front roof panel having a left side rail and a left panel center rail;
a support affixed to one of the center rails and detachably assembled to the other of the center rails;
a latching mechanism incorporated in each of the right and left side rails, wherein the right and left roof panels are detachably assembled to the vehicle to cover a front portion of a roof opening in a closed position with the support assembled to the other center rail and the latching mechanisms being secured to the vehicle, and wherein the right and left roof panels are removed from the front portion of the opening leaving the front portion of the opening unobstructed wherein the latching mechanisms are not secured to the vehicle and the support being disassembled from the other center rail;
an intermediate roof section;
a rear roof section defining a back light opening;
a back light detachably received in the back light opening; and
a linkage articulately connecting the intermediate roof section, the rear roof section and the back light together, wherein the intermediate roof section is articulately connected to the rear roof section to move from an extended position in front of and contiguous with the rear roof section to a retracted position in a storage compartment, the rear roof section is articulately connected to the vehicle and the intermediate roof section to move from an extended position extending from the intermediate roof section to the vehicle, to a retracted position in which the rear roof section is in the storage compartment, and wherein the back light is articulately connected to the rear roof section to move from an extended position in which the back light is received in the back light opening to a retracted position in which the back light is separated from the back light opening in the storage compartment.

5. The retractable hardtop of claim 4 further comprising:
a stationary support extending above a passenger compartment of the vehicle in a cross-car direction, the stationary support being disposed between the right and left front panels and the intermediate roof section.

6. The retractable hardtop of claim 4 wherein the intermediate roof section is disposed over the back light and rear roof section in the retracted position and the back light is disposed between the intermediate roof section and the rear roof section in the retracted position.

7. The retractable hardtop of claim 6 further comprising a window separating link and a back section link that separate the back light from the back light opening of the rear roof section and guides the movement of the back light relative to the rear roof section.

8. The retractable hardtop of claim 4 further comprising a front link pivotally connected to the intermediate roof section, an intermediate link and a main link, and further comprising a forward flange secured to the rear roof section and a rearward flange secured to the intermediate roof section and the forward flange to lift the intermediate roof section above the rear roof section as the hardtop is moved from the extended position to the retracted position.

9. A retractable hardtop for a vehicle comprising:
a right front roof panel having a right side rail and a right panel center rail;
a left front roof panel having a left side rail and a left panel center rail;
a support affixed to one of the center rails and detachably assembled to the other of the center rails;

a latching mechanism incorporated in each of the right and left side rails, wherein the right and left roof panels are detachably assembled to the vehicle to partially cover a roof opening in a closed position with the support assembled to the other center rail and the latching mechanisms being secured to the vehicle, and wherein the right and left roof panels are removed from the opening leaving the opening unobstructed wherein the latching mechanisms are not secured to the vehicle and the support being disassembled from the other center rail;

an intermediate roof section;

a rear roof section defining a back light opening;

a back light detachably received in the back light opening; and a linkage articulately connecting the intermediate roof section, the rear roof section and the back light together, wherein the intermediate roof section is articulately connected to the rear roof section to move from an extended position in front of and contiguous with the rear roof section to a retracted position in a storage compartment, the rear roof section is articulately connected to the vehicle and the intermediate roof section to move from an extended position extending from the intermediate roof section to the vehicle, to a retracted position in which the rear roof section is in the storage compartment, and wherein the back light is articulately connected to the rear roof section to move from an extended position in which the back light is received in the back light opening to a retracted position in which the back light is separated from the back light opening in the storage compartment; and a stationary support extending above a passenger compartment of the vehicle in a cross-car direction, the stationary support being disposed between the right and left front panels and the intermediate roof section.

* * * * *